(12) United States Patent
Sommer et al.

(10) Patent No.: US 7,313,640 B2
(45) Date of Patent: Dec. 25, 2007

(54) SYSTEM AND METHOD FOR TRANSMITTING BIDIRECTIONAL SIGNALS OVER A CABLE ANTENNA

(75) Inventors: René Sommer, Renens VD (CH); Pierre Chênes, Eclepens (CH); Philippe Junod, Romanel-sur-Morges (CH)

(73) Assignee: Logitech Europe S.A., Romanel-sur-morges (CH)

( * ) Notice: Subject to any disclaimer, the term of this patent is extended or adjusted under 35 U.S.C. 154(b) by 320 days.

(21) Appl. No.: 10/910,951

(22) Filed: Aug. 3, 2004

(65) Prior Publication Data

US 2006/0031608 A1 Feb. 9, 2006

(51) Int. Cl.
*H04B 7/00* (2006.01)
*H04B 1/38* (2006.01)

(52) U.S. Cl. ............... 710/100; 455/41.2; 455/557; 710/710

(58) Field of Classification Search ...... 455/41.1–41.3, 455/556.1–556.2, 557–559; 710/100, 316, 710/1–19, 62–73, 105–106
See application file for complete search history.

(56) References Cited

U.S. PATENT DOCUMENTS

| | | | | |
|---|---|---|---|---|
| 6,078,789 | A * | 6/2000 | Bodenmann et al. | 455/41.2 |
| 6,275,682 | B1 * | 8/2001 | Yen et al. | 455/41.2 |
| 6,844,895 | B1 * | 1/2005 | Billerbeck et al. | 348/211.2 |
| 7,028,114 | B1 * | 4/2006 | Milan et al. | 710/100 |
| 7,053,798 | B2 * | 5/2006 | Popineau | 341/20 |
| 2002/0101706 | A1 * | 8/2002 | Shin | 361/683 |
| 2003/0083013 | A1 * | 5/2003 | Mowery et al. | 455/41 |
| 2004/0067737 | A1 * | 4/2004 | Kuo | 455/90.3 |
| 2005/0020225 | A1 * | 1/2005 | Lazzarotto et al. | 455/226.1 |
| 2005/0124295 | A1 * | 6/2005 | Xian et al. | 455/41.3 |
| 2005/0254647 | A1 * | 11/2005 | Anandakumar et al. | 380/42 |

OTHER PUBLICATIONS

Terk TV 44 Amplified antenna for multi-LNB satellite dish, product description downloaded from http://www.crutchfield.com/S-SuzUK9zUASO/cgi-bin/ProdView.asp?g=15920&id=detail on Dec. 6, 2004.
UHF TV Reception Guide—Stallions Statellite and Antenna, Preamplifiers, product description downloaded from http://www.tvantenna.com/support tutorials/uhf.html on Dec. 6, 2004.
6904 IFD 4 input, 4 output multiswitch, product brochure downloaded from http://www.starkelectronic.com/wing2.htm on Dec. 6, 2004.

* cited by examiner

*Primary Examiner*—Simon Nguyen
(74) *Attorney, Agent, or Firm*—Townsend and Townsend and Crew, LLP

(57) ABSTRACT

A method and system for data wireless systems on computers, for using the same cable to bi-directionally transmit antenna signals as well as other signals to and from the inside of a shielded computer housing. An example of a control signal is a connect signal for establishing initial contact between the computer and a remote wireless device. An example of a control signal transmitted from inside the computer housing to the outside, is a signal for lighting an LED. Antenna signals are separated from the control signals based on differences between these signals, for example, differences in frequency. In one embodiment, a capacitor filters out a DC control switch signal, while the high frequency antenna signal is filtered by the normal input pin circuitry of a processor.

19 Claims, 6 Drawing Sheets

SYSTEM AND METHOD FOR TRANSMITTING BIDIRECTIONAL SIGNALS OVER A CABLE ANTENNA

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to wireless communications, and more specifically to bidirectional communication of control signals and antenna signals over a cable, through the housing of a computer.

Wireless technology has become increasingly popular in recent years. Many computer peripherals (e.g., keyboards, mice, trackballs, gaming devices, speakers, etc.) are now wireless or cordless, and the concept of the cordless desktop has risen in popularity. Various technologies are used for wireless peripherals, such as technology utilizing 27 MHz frequency, Bluetooth technology, and so on.

In addition, the concept of wireless Local Area Network (LAN) is also emerging. One technology that is being used for wireless LAN is in accordance with the 802.11 standard (sometimes referred to as Wireless Fidelity (Wi-Fi) technology).

In general, regardless of the specific purpose for which the wireless technology is used, and regardless of the specific wireless technology used, wireless communication employs signals that are transmitted from a transmitter to a receiver. (Often, there are transceivers on each end of the wireless communication path, so that each end can both receive and send wireless signals.) The transmitter and receiver each have an antenna for transmission and reception of the wireless signals.

For purposes of further discussion, let us take the example of a wireless keyboard in communication with a personal computer. Conventionally, a transceiver is connected to the computer externally. The antenna in the transceiver is thus also external to the computer's metallic housing, and thus can communicate freely with the transceiver in the wireless keyboard. Having an external transceiver, however, can be cumbersome, since the user has to plug in and manage another device. Thus, in accordance with embodiments of the present invention, the transceiver connected to the computer is moved to within the metallic housing shielding the computer. The antenna of the transceiver, however, needs to be outside the metallic housing of the computer, in order for the wireless signals to be unimpeded.

The transceiver located inside the computer housing thus needs to be connected to an antenna module located outside the computer housing. This can be achieved by means of a cable which passes through the computer housing. In addition, apart from the antenna signals certain other signals also often need to be passed from outside the computer housing to the transceiver, and from the transceiver to outside the computer housing. One example of such a signal is a "connect" signal to initiate communication between the transceiver in the computer and the transceiver in a wireless peripheral device. Another example of such a signal is when a user needs to be notified of certain events, and the notification signal is initiated inside the computer housing, and needs to be perceptible to the user on the outside.

Generally separate cables and/or connections are used for transmitting the antenna signals, and for transmitting the other signals. It is, however, desirable to reduce the number of cables used for several reasons. First, cables can be expensive. Further, cables often use special connectors which add to the expense. Moreover, it is inelegant to have numerous or larger openings in the housing of the computer in order to have numerous cables running through each of these openings.

Thus there is a need for a system and method for reducing the number of cables transmitting signals from the inside of a computer housing to the outside, and vice versa. Further, there is a need for a system and method for using the same cable for bi-directionally transmitting antenna signals as well as other signals from the inside of a computer's housing to the outside.

BRIEF SUMMARY OF THE INVENTION

The present invention is a system and method for wireless systems for data communications on computers, where cables can be used to transmit antenna signals as well as to bi-directionally communicate other signals to and from the inside of a shielded computer housing. It is to be noted that the present invention is not limited to computers, but rather to any device which has a housing, and which needs an external antenna.

In one embodiment, a system in accordance with the present invention can be used for wireless computer peripherals (e.g., mice, keyboards, gaming devices, speakers, etc.) using the 27 MHz wireless technology. In another embodiment, a system in accordance with the present invention can be used for wireless devices using the Bluetooth technology. In yet another embodiment, a system in accordance with the present invention can be used with the Wi-Fi technology.

One or more antenna signals, as well as other signals, can be communicated over the same cable from/to the inside of the shielded computer housing. These other signals can include control signals, such as signals for establishing initial contact between the computer and the remote wireless device, and signals for indicating the occurrence of certain pre-specified events on the computer. The former is an example of a signal which is transmitted from outside the computer housing to the inside, while the latter is an example of a signal which is transmitted from inside the computer housing to the outside.

Since the same cable is used to transmit antenna signals and other signals, these various signals need to be separated from each other. In a system in accordance with one embodiment of the present invention, this separation is based on frequency differences between the antenna signals and the other signals. In one embodiment, various antenna signals can also be separated from each other based on frequency differences between them (e.g., Bluetooth signals and 27 MHz signals). In one embodiment, the signals are differentiated based on frequency using simple electrical components such as resistors and capacitors. In one embodiment, a choke is also used for this purpose.

In one embodiment, the cable is shared between a control signal (e.g., button press) that is a DC level, and a high frequency signal. A simple circuit separates the DC from the high frequency signal. A capacitor can filter out the DC from a receiver for the antenna signal, while the high frequency antenna signal can be filtered from the input to a processor by the processor's internal input filtering and by taking advantage of the antenna signal being in the microvolt range, below the lower detection limit for the processor input pin.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

The figures depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

It is to be noted that a system in accordance with the present invention can be used in various different contexts. In particular, a system in accordance with the present invention can be used in several contexts in which wireless technology is used for computers. In one embodiment, a system in accordance with the present invention can be used for wireless computer peripherals (e.g., mice, keyboards, gaming devices, speakers, etc.) using various types of wireless technologies. These can include, amongst other, 27 MHz wireless technology, Bluetooth technology. In another embodiment, a system in accordance with the present invention can be used with Wireless Local Area Network (WLAN) products. For instance, a system in accordance with an embodiment of the present invention can be used for wireless LAN products employing the 802.11 technology (sometimes referred to as Wireless Fidelity (Wi-Fi) technology). For purposes of discussion, this application uses the example of the use of the present invention in the context of wireless peripheral devices.

Figure 1:
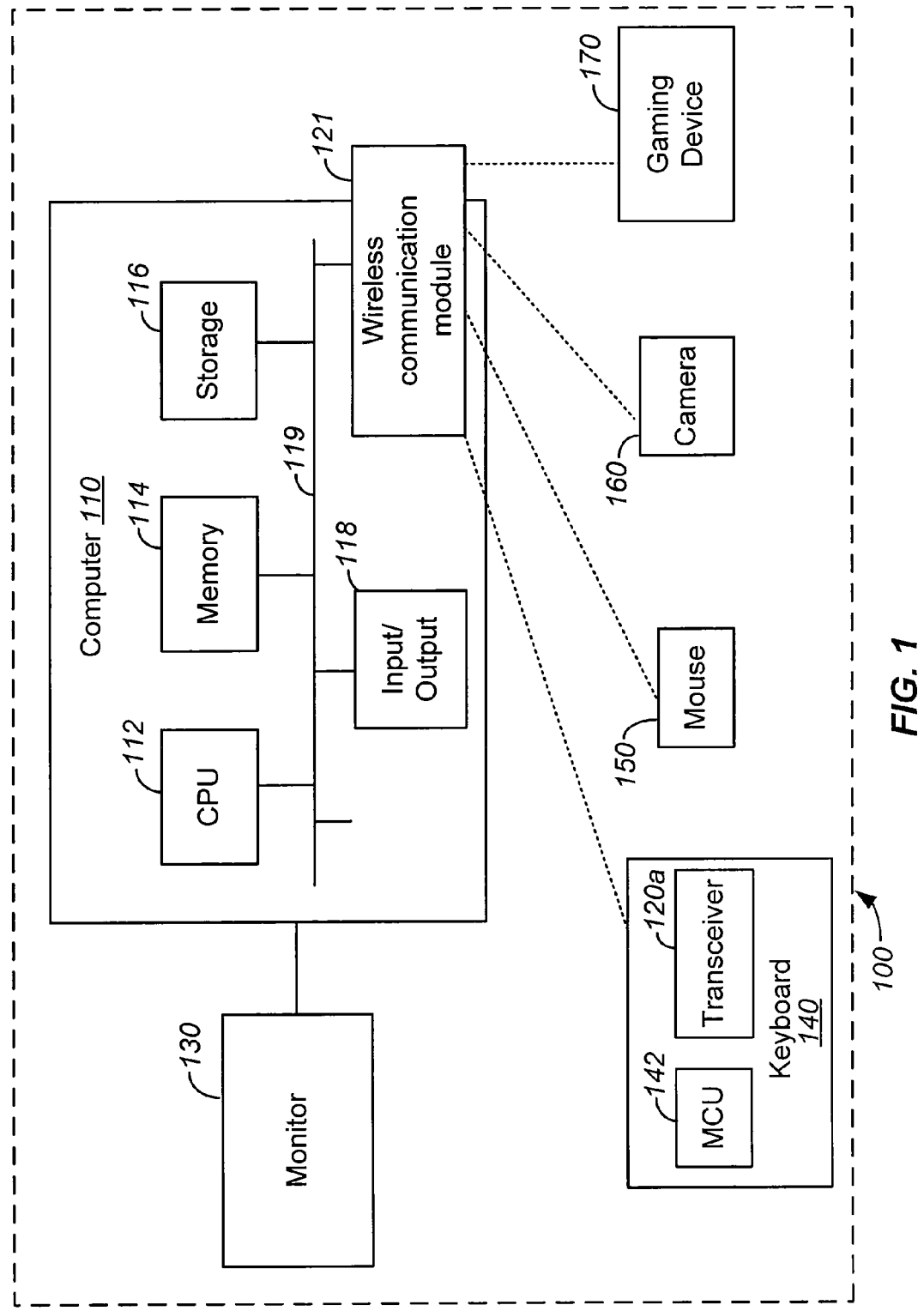
FIG. 1 is a system-level diagram of one embodiment of a data processing system having one or more cordless devices that includes an antenna system in accordance with the present invention.

FIG. 1 is a system-level diagram of one embodiment of a data processing system 100 having one or more cordless (or wireless) electronic peripheral devices. The data processing system 100 comprises a computer 110, a transceiver 120a, a monitor 130, and several wireless peripheral devices 140-170.

The computer 110 may be a conventional intelligent device, for example, a personal computer, a personal digital assistant, a set-top box, or the like. As mentioned above, in other embodiments, the present invention is used for any device which has a housing and requires an external antenna. In one embodiment, the computer 110 includes a central processing unit (CPU) 112, a memory 114, an optional storage device 116, an optional input/output port 118, and a wireless communication module 121. The CPU 112, the memory 114, the storage device 116, the input/output port 118, and the wireless communication module 121 are coupled through a data bus 119.

In one embodiment the CPU 112 is a conventional processor, for example, an Intel (Santa Clara, CA) Pentium®-type processor or an IBM PowerPC™-type processor.

The memory 114 is a conventional memory, for example, a dynamic random access memory or a static random access memory. The storage device 116 is a conventional storage device, for example, a magnetic disk storage device, an optical disk storage device, a tape storage device, or a solid state (e.g., flash memory) storage device. The data bus 119 is a conventional data bus, for example, a system bus or a peripheral component interconnect bus.

In addition, in accordance with an embodiment of the present invention, the wireless communication module 121 is partly within the housing of the computer 110, and partly outside of it. In particular, an antenna module is outside the housing of the computer 110, while a transceiver is inside the housing of the computer 110, amongst other things. The various components of the wireless communication module 121 are described in more detail with respect to FIGS. 2 and 3.

Monitor 130 is any conventional display unit which can be used with computer 110. The peripheral devices may include control devices, for example, a keyboard 140, a mouse 150. The peripheral devices may also include imaging devices, for example, a video camera 160 or a scanning device. Yet other peripheral devices include, for example, a gaming device 170 (e.g., a cordless driving wheel, joystick, or game controller). Still other examples of peripheral devices are trackballs, touch pads, printers, entertainment devices (e.g., cordless speakers), digital pens, etc. Some or all of these peripheral devices are wireless/cordless, and are communicatively coupled wirelessly to the wireless communication module 121.

In one embodiment, a wireless peripheral device, such as the keyboard 140, includes a MicroController Unit (or MCU) 142, and a transceiver 120a. It is noted that the memory may be incorporated within the MCU 142. In one embodiment, the transceiver 120a is capable of both receiving and transmitting communication signals. It is to be noted that depending on the specific wireless device, the transceiver 120a may instead be a receiver which is capable of only receiving communication signals, or a transmitter which is capable of only transmitting communication signals. The transceiver 120a is a conventional transceiver device. In addition, the peripheral device includes other components related to the functionality of the specific peripheral device. For instance, mouse 150 may include an optical module, a memory, etc. In one embodiment, the various components of the wireless peripheral device are coupled through an electrical signal line, which may be a type of data bus. In addition, it is to be noted that the various wireless devices also include a power source to supply power to the appropriate components, for example, the MCU 142 or the transmitter 120a.

The MCU 142 is a conventional MCU, for example a Motorola 6805 or 6808 families of MCUs. The transceiver 120a is a conventional transceiver. The components may be conventional components, for example, an optical module assembly from Agilent Technologies (Palo Alto, Calif.).

As mentioned above, the computer 110 and the peripheral device, e.g., the keyboard 140, are communicatively coupled through the transceiver 120a and the wireless 10 communication module 121. For example, the keyboard 140 sends data to the computer 110 using any wireless protocol. More particularly, the transceiver 120a couples with an antenna system through which the wireless protocol is sent via a communication signal to an antenna that couples with a transceiver 120a in the wireless communication module 121 at the computer 110. In one embodiment, the communication signal may be a radio frequency signal operating in a wide range of frequencies, for example, from a few Mega Hertz to several Giga Hertz. In one embodiment, the communication signal may be a Bluetooth signal, whose frequency is in several Giga Hertz (e.g., 2.4 GHz).

Referring again to wireless communication module 121, it can be seen that part of the wireless communication module 121 is located within the housing of the computer 110, while part of the wireless communication module 121 is located outside the housing of the computer 110. This is because the computer housing is metallically shielded, and at least the antenna module of the wireless communication module 121 needs to be outside this metallic shield in order to function adequately.

In order to connect the antenna module (which is placed outside the computer housing) with the remainder of the transceiver modules (which are placed inside the computer), in one embodiment, a coaxial cable is used. Other signals which need to be transmitted are sent over another cable connecting the inside and the outside of the computer housing. This is illustrated in FIG. 2.

Figure 2:
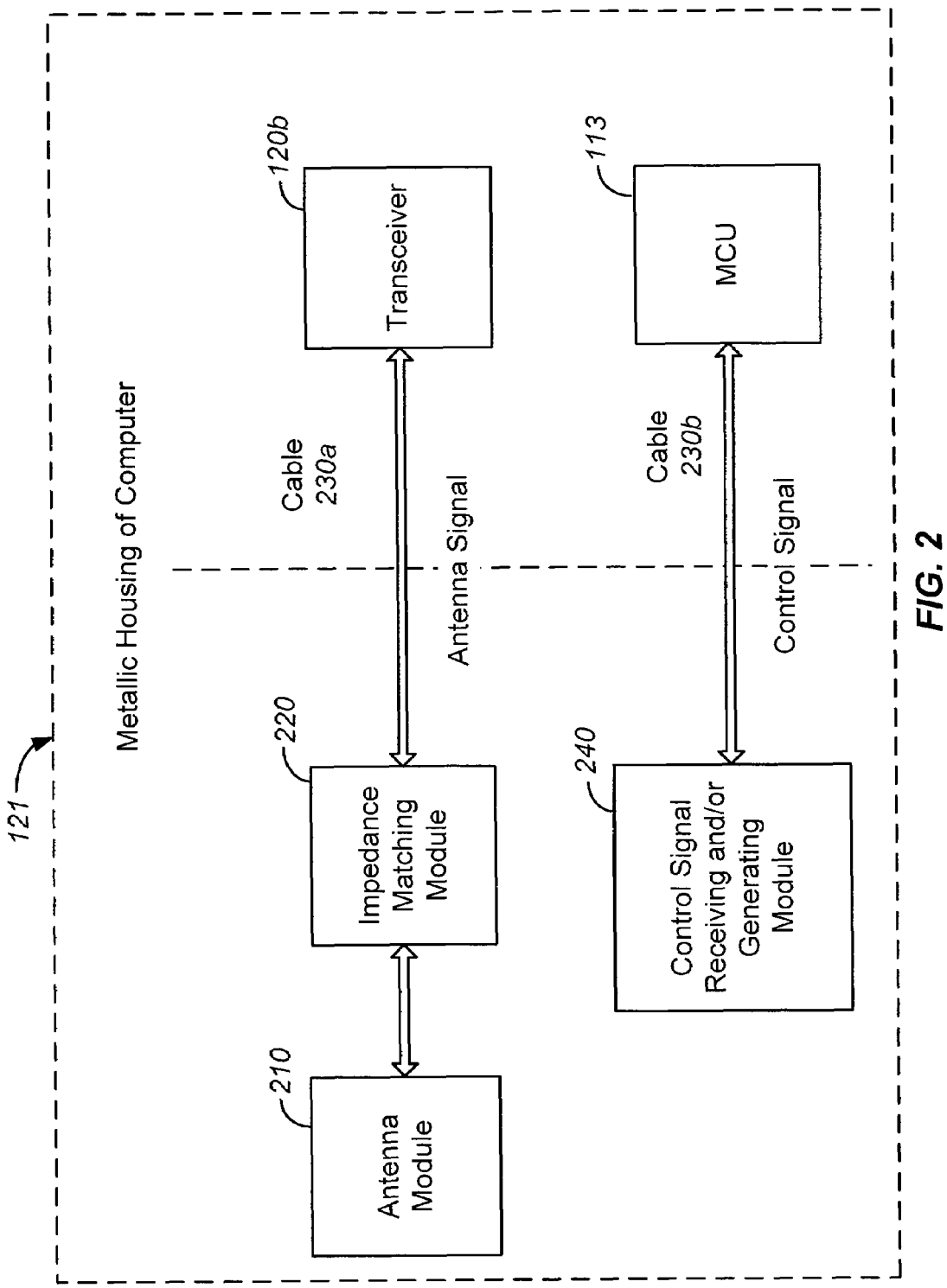
FIG. 2 is a block diagram of a wireless communication module where separate cables are used for transmission of antenna signals and other signals.

FIG. 2 is a block diagram of one embodiment of a wireless communication module 121, where separate cables are required for transmitting antenna signals and control signals across the computer's metallically shielded housing. The wireless communication's module 121 is comprised of an antenna module 210, an impedance matching module 220, a coaxial cable 230a, a transceiver 120b, a signal receiving and/or generating module 240, a second cable 230b, and a Micro Controller Unit (MCU) 113.

The antenna module 210 can include any antenna which can be used for wireless communications. Examples of antennas include loop antennas, whip antennas, etc. The specific antenna used will depend on the technology used for wireless communication. For instance, antennas use technologies including radio-frequency wireless technology, Bluetooth, etc.

Coaxial cable 230a is a type of wire that consists of a center wire surrounded by insulation and then a grounded shield of braided wire. The shield minimizes electrical and radio frequency interference. Coaxial cables are generally more expensive than standard cables, but are much less susceptible to interference, emit less interference and can carry much more data. It is to be noted that other types of cables could be used in place of coaxial cable 230a, and that the use of the coaxial cable is one possible embodiment.

The coaxial cable 230a generally has impedance different from the impedance of the antenna module 210. In one embodiment, the coaxial cable has low impedance (for example, 50 ohms), while the impedance of the antenna module 210 is high. Thus, an impedance matching module 220 is needed in order to match the different impedances of the coaxial cable 230a and the antenna module 210. The impedance matching module 220 can be any type of passive transformer used in the art.

The coaxial cable 230a communicatively couples the antenna module 210, which is located outside the housing of the computer 110, to the transceiver 120b, which is located inside the housing of the computer 110. The transceiver 120b can be any conventional transceiver which can both transmit and receive signals. In one embodiment, only a receiver is used, while in another embodiment, only a transmitter is used. The transceiver 120b communicates with transceiver(s) 120a in the wireless peripheral devices.

In addition to antenna signal, it is often desirable to communicate other signals to and from inside of the computer housing to the outside of the computer housing. One example is a control signal which can be triggered by a user by using a switch on transceiver 120b. Such a switch needs to be accessed by a user on the outside of the computer housing. Such a switch can be used to transmit signals to the transceiver, which in accordance with an embodiment of the present invention, is located inside the housing of the computer. For instance, wireless peripheral devices often have a "connect" button in order to establish the initial connection between the transceiver 120a in the wireless peripheral device and the transceiver 120b connected to the computer. A corresponding "connect" button exists on transceiver 120b. When both "connect" buttons are pressed, a communication link is established between the two transceivers 120a & 120b.

It may also be desirable to send signals from within the computer housing to the outside. For instance, a user may want to receive an indication of the occurrence of certain events, by means of seeing an LED light up when these events occur. Examples of such events include establishing and/or losing of the connection, a signal being sent, etc.

Yet another example of signals which may be transmitted from/to the inside of the computer housing includes a series of control signals which controls numerous buttons/LEDs. In such an embodiment, some intelligence is present near the antenna module to distinguish between the various signals. This intelligence needs some power to operate, and in one embodiment, power is also sent over the same cable which transmits the antenna signals and the control signals.

It is to be noted that various different antenna signals may also be sent/received from the inside of the computer housing to the outside. For instance, a Bluetooth antenna signal and a 27 MHz antenna signal may both be sent/received.

One solution for transmitting these other signals from and to the inside of the metal housing, is to use a separate cable 230b to transmit such signals, as shown in FIG. 2. The cable 230b communicatively couples the signal receiving and/or generating module 240 with the transceiver 120b.

The solution illustrated in FIG. 2 however includes multiple cables 230a and 230b. It is desirable to reduce the number of cables used for several reasons. First, cables are expensive. Further, cables often use special connectors, which add to the expense. Moreover, it is inelegant to have numerous or larger openings in the housing of the computer in order to have several cables running through each of these openings.

In accordance with an embodiment of the present invention, the same cable can be used for transmitting various antenna signals, as well as communicating other signals bi-directionally between the inside of the computer housing and the outside. In one embodiment, the same cable is also used to transmit power between the inside of the computer housing and the outside. It is to be noted that some specific embodiments discussed below focus on separating an antenna signal from a control signal. However, the techniques discussed below have more general applicability, and can be used for various other purposes, such as separating power from antenna signals, separating various antenna signals from each other, etc.

Figure 3:
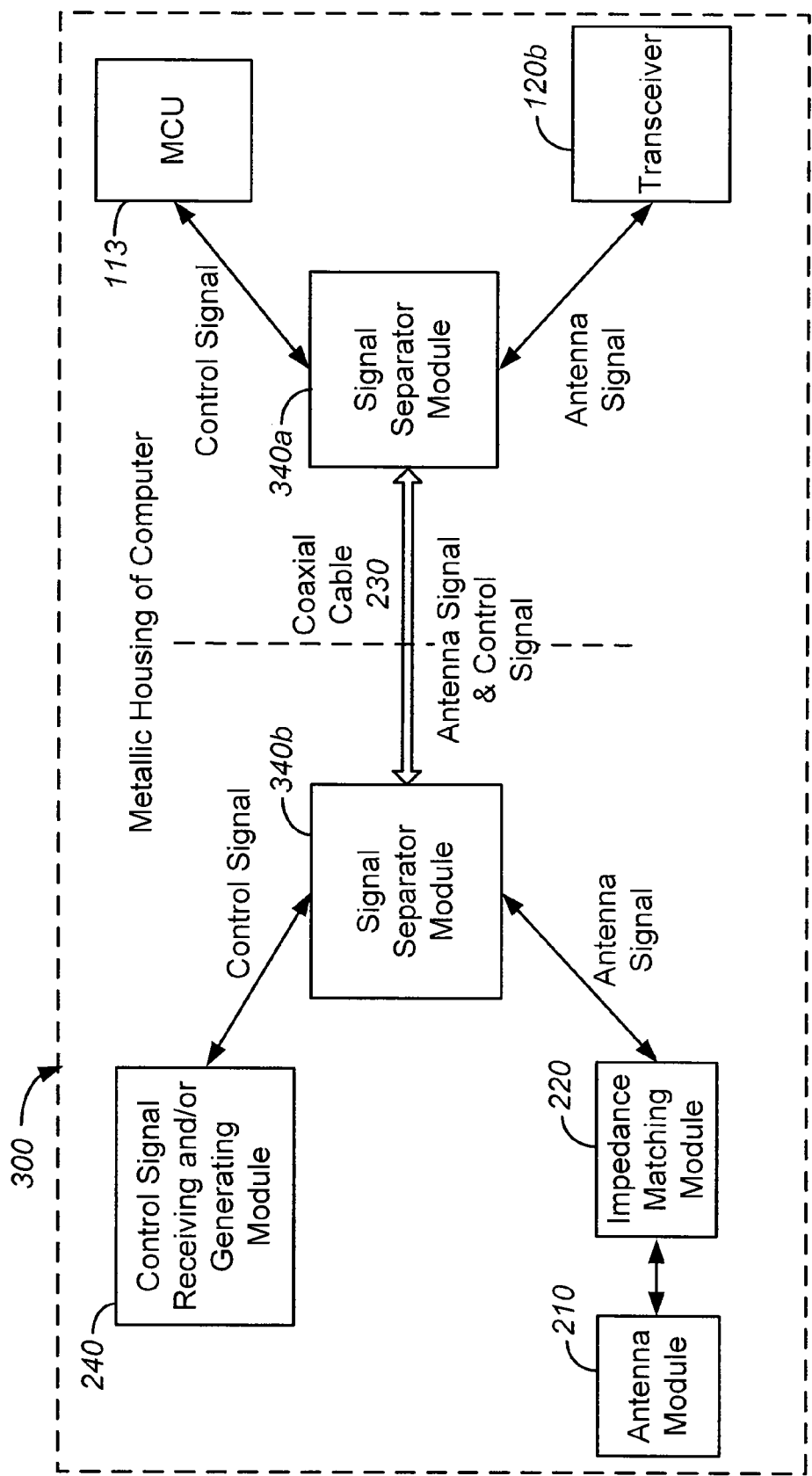
FIG. 3 is a block diagram of a wireless communication module in accordance with an embodiment of the present invention, where a single coaxial cable is used for transmission of antenna signals and other signals.

FIG. 3 is a block diagram of a system 300 in accordance with one embodiment of the present invention, where a single cable can be used to transmit not only antenna signals, but also to communicate control signals across the computer's metallic shield housing. System 300 comprises an antenna module 210, an impedance matching module 220, a signal receiving and/or generating modules 240, a coaxial cable 230, signal separator modules 340a and 340b, a transceiver 120b, and an MCU 113.

The antenna module 210, the impedance matching module 220, a signal receiving and/or generating module 240, the transceiver 120a, and the MCU 113, have been described above with respect to FIG. 2.

The coaxial cable 230 is used, in this embodiment, to transmit both antenna signals as well as other signals (e.g., control signals) bi-directionally. It is to be noted that in other embodiments, other types of cables are used in place of coaxial cable 230. Since the same cable 230 is used to transmit different types of signals, signal separator modules 340a and 340b are needed to separate out the antenna signal from other non-antenna signals.

In accordance with an embodiment of the present invention, these other signals are distinguishable in some way from the antenna signals. For instance, while antenna signals are relatively high frequency signals (generally in several Mega-Hertz at the least), low frequency signals (e.g., only a few hundreds of Hertz to a few kilo-Hertz) could be used to transmit other information. Thus in one embodiment, the signal separator modules 340a and 340b use frequency filters to distinguish antenna signals from these various signals.

For incoming signals, once the other signals are separated from the antenna signals, they can be directed to their respective destinations, where they can be processed. In one embodiment, antenna signals are directed to the transceiver 120a, while the other signals are directed to the MCU 113.

Figure 4:
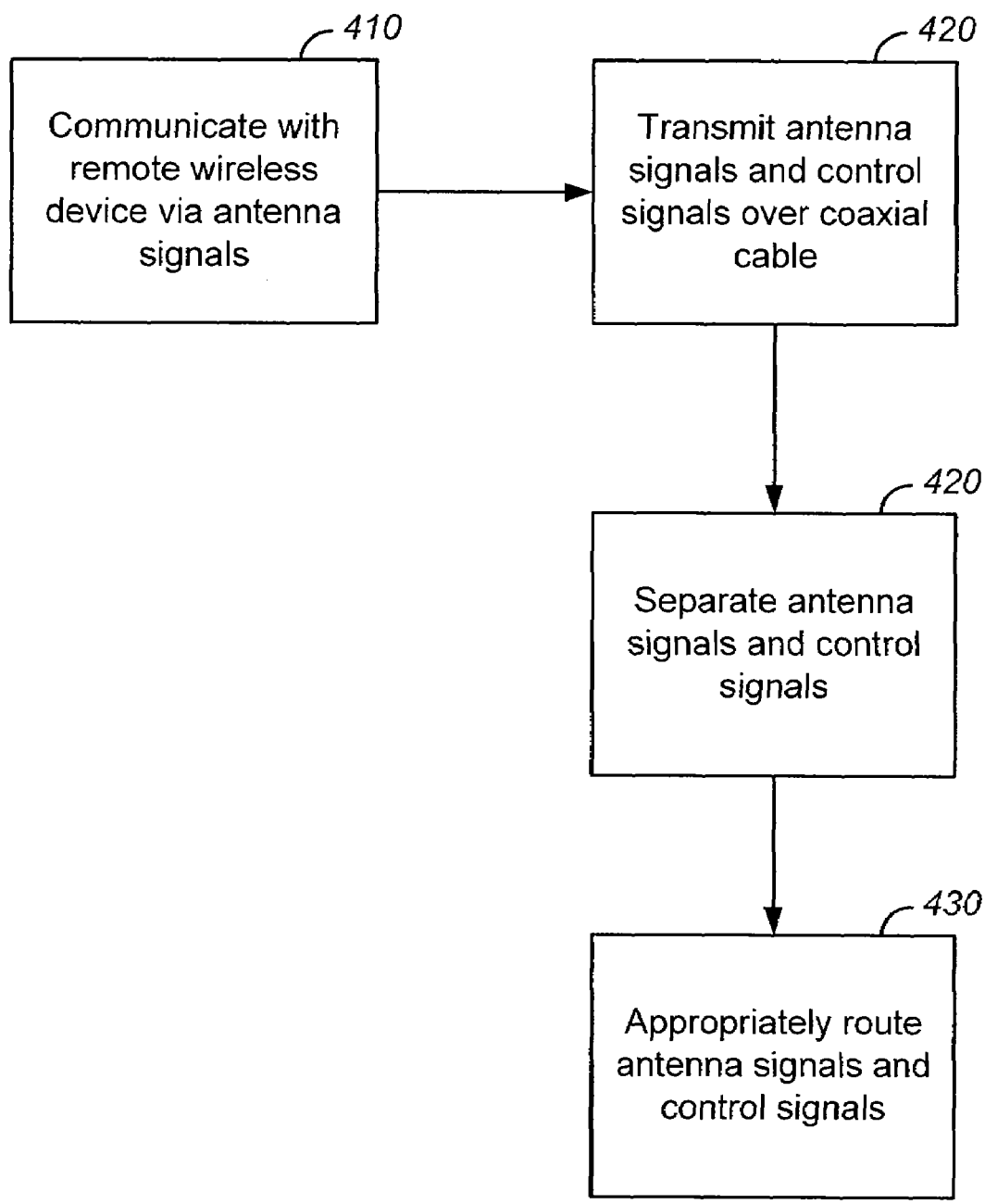
FIG. 4 is a flowchart illustrating the functioning of a system in accordance with an embodiment of the present invention.

FIG. 4 is a flowchart illustrating the functioning of a system in accordance with an embodiment of the present invention. The antenna module 210 communicates (step 410), via antenna signals, with a remote wireless device. In one embodiment, the antenna module receives antenna signals from the remote wireless device. In another embodiment, the antenna module 210 sends antenna signals to the remote wireless device. In yet another embodiment, the antenna module 210 sends as well as receives antenna signals from the remote wireless device.

For purposes of discussion, let us focus on the embodiment where antenna signals are received by the antenna module 210 from the remote wireless device, and where a control signal is to be transmitted from outside the computer housing to the inside. The antenna signals, as well as any the control signals, are transmitted (step 420) from the outside of the computer housing to the inside over the coaxial cable 230.

These signals are then separated (step 430) on the inside of the computer housing. The antenna signals are then routed (step 440) to the transceiver 120b, while the control signals are routed (Step 440) to the MCU 113, for further processing.

It will be obvious to one of skill in the art that a system in accordance with an embodiment of the present invention is also usable in a situation where control signals as well as antenna signals are transmitted from the inside of the computer housing to the outside. Moreover, a system in accordance with an embodiment of the present invention also accommodates a situation where the control signal is transmitted in one direction (e.g., from the inside of the computer housing to the outside) and the antenna signal is transmitted in the other (e.g., from the outside of the computer housing to the inside). Thus a system in accordance with an embodiment of the present invention is a bi-directional system for both the antenna signals as well as the other signals.

Figure 5:
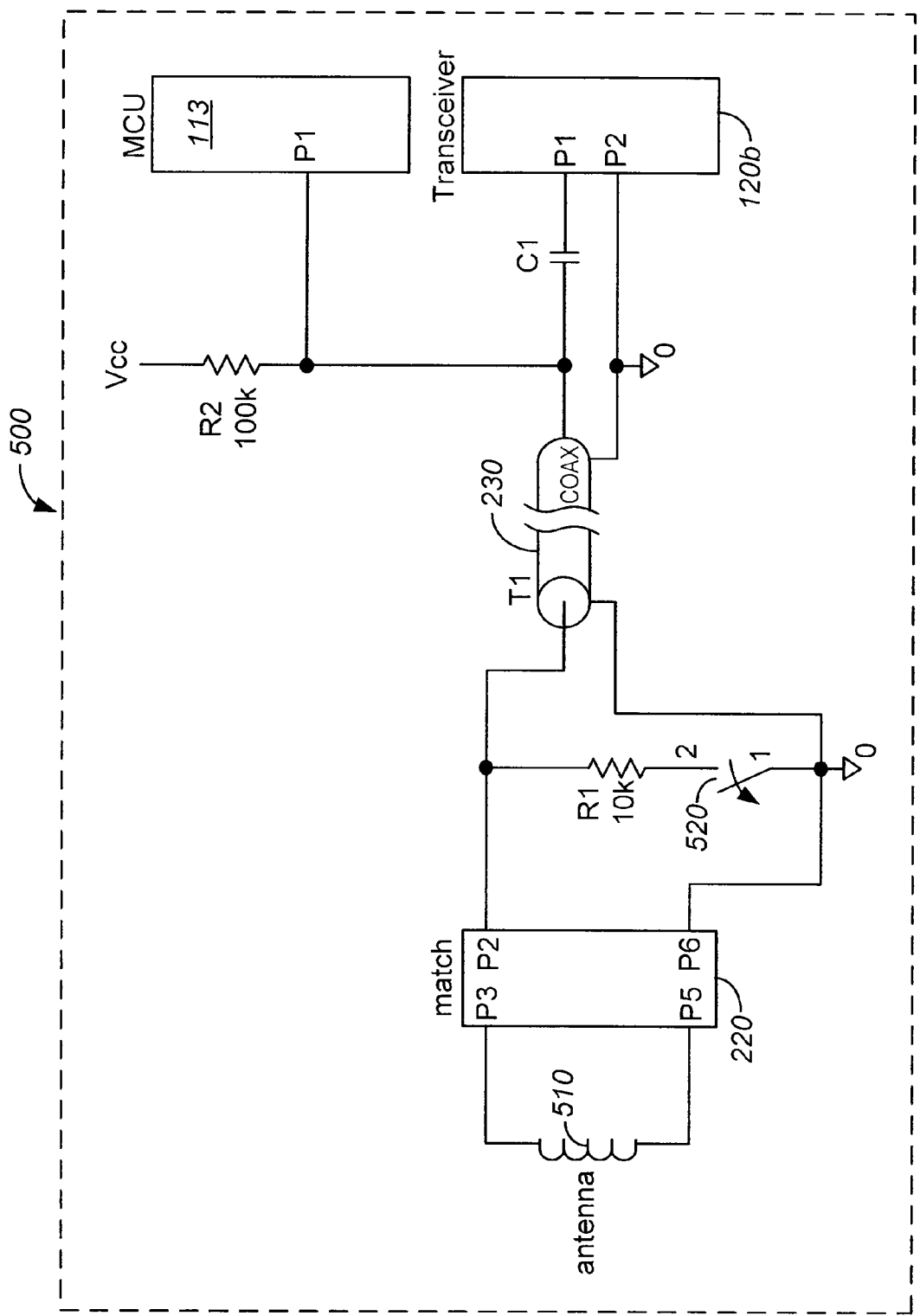
FIG. 5 is a circuit diagram of an embodiment of the present invention in which the circuit can be used for transmitting antenna signals and control signals over a single coaxial cable from the outside of a computer housing to the inside.

FIG. 5 is a circuit diagram representing one possible embodiment 500 in which a control signal can be transmitted by the user to the MCU 113 located within the metal covering of the CPU. As mentioned above, the coaxial cable 230 connects the inside of the CPU's housing with the outside. In FIG. 5, the portion to the right of the coaxial cable 230 represents the inside of the computer housing, and the portion to the left of the coaxial cable 230 represents the outside.

As discussed above, the antenna module 210 and the impedance matching module 220 are located outside the computer's shielded housing. In FIG. 5, the antenna 510 is connected to pins P3 and P5 of the impedance matching module 220. Two other pins, P2 and P6, of the impedance matching module 220 are connected to a resistor R1, and to ground, respectively. Resistance R1 is connected to ground through a switch 520. This switch 520 is the "button" that the user can manipulate to transmit signals from outside the computer housing to the MCU 113 on the inside.

The coaxial cable 230 has three connections on the inside of the computer housing. One connection is to an "in" pin in the MCU 113, as well as to one end of a resistor R2. The other end of the resistor R2 is connected to high voltage Vcc (e.g., 5V or 3.3. V). Relative to resistance R2, resistance R1 is small. For example, in one embodiment, resistance R2 is 100 kilo-ohms, and resistance R1 is 10 kilo-ohms.

The second connection from the coaxial cable 230 is to an "RFin" pin P1 in the transceiver 120b, via a capacitor C1. In one embodiment, the capacitor used is 100 nano-Farads. The third connection from the cable 230 is to ground. An "RFgnd" pin P2 in the transceiver 120a is also connected to ground.

The functioning of circuit 500 is as follows. When the switch 520 is not pressed by the user, no current can flow through resistor R1. Thus, with switch 520 open, only antenna signals are being communicated from outside the computer housing to the inside. Antenna signals are high frequency signals (when compared to the low frequency control signals). Capacitor C1 serves as a short circuit (or as very low impedance) for high frequency signals, and allows them to pass through. Thus the high frequency antenna signals will be transmitted to the transceiver 120b, via pin "RFin".

When the switch 520 is closed, current flows through resistor R1. A low frequency signal is transmitted from outside the computer housing to the inside. Direct Current (DC) signals are blocked, and low frequency signals are attenuated, by the capacitor C1. This fact is used to direct the low frequency control signals to the MCU 113, and not to the transceiver 120b. When switch 520 is closed, resistors R2 and R1 are connected in a voltage divider configuration. The working of the voltage divider will be governed by the ratio of R2:R1, which is 10:1 in this embodiment. Thus, in this embodiment, the "in" pin on the MCU 113 is at a low voltage of 0.1 Vcc when the switch 520 is closed. On the other hand, when the switch 520 is open, the "in" pin on the MCU 113 is pulled to a high voltage of Vcc. Thus the "in" pin of the MCU 113 can detect whether the switch 520 is open or closed based on whether it is at a low or a high voltage. R2's role when switch is open is to pull up the MCU input to a high level. The value of R2 is much higher than cable impedance because the high value makes sure that R2 does not change (does not impact) the antenna system impedance.

As discussed above, because capacitor C1 provides low impedance to high frequency signals, it allows the high frequency antenna signals to pass through, while it attenuates/blocks the much lower frequency control signals. Thus the low frequency control signal is received by the MCU 113 at the "in" pin, but not by the "RFin" pin of the transceiver 120b. The microprocessor input pin does not pick up the high frequency antenna signal due to internal filtering connected to the input pin, and also because the radio frequency signal voltage level is very small (microvolts) compared to the switch (DC) signal (Volts). Thus circuit 500 illustrates a system in accordance with an embodiment of the present invention, in which control signals can be transmitted from the outside of the computer housing to the inside, over the same cable on which antenna signals are transmitted.

Figure 6:
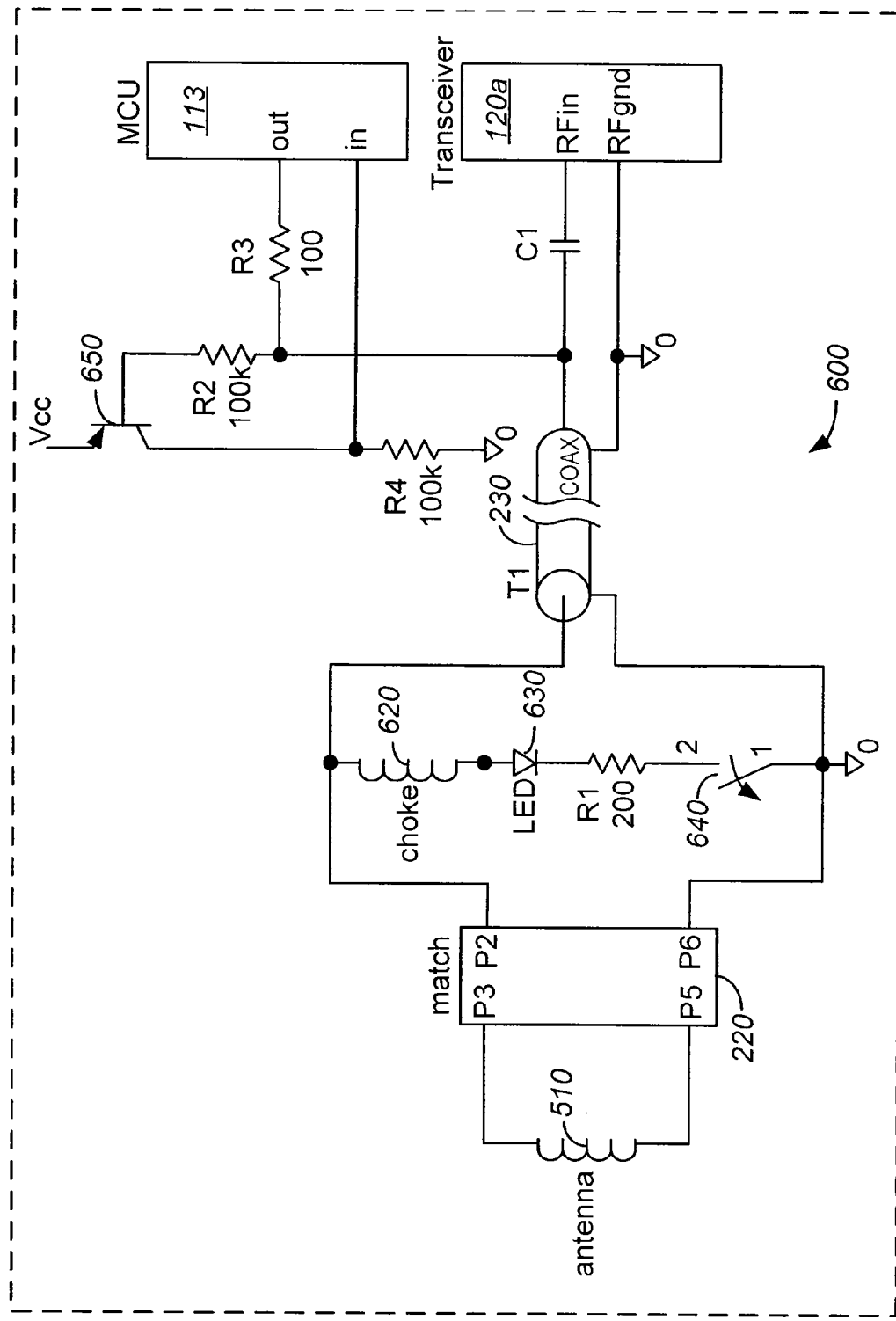
FIG. 6 is a circuit diagram of an embodiment of the present invention in which the circuit can be used for bi-directional transmission of antenna signals and control signals over a single coaxial cable.

FIG. 6 is a circuit diagram 600 illustrating bi-directional transmission of control signals using the same cable over which antenna signals are transmitted, in accordance with one embodiment of the present invention. For example, a button could be pressed by a user on the outside to transmit a signal to the inside of the computer housing. In addition, the occurrence of some events could trigger the transmission of a signal from the inside of the housing, resulting in the lighting up of a Light Emitting Diode (LED) on the outside, as a notification to the user.

Circuit 600 also includes an antenna 510 and an impedance matching module 220. Circuit 600 is first described, and then its functionality is explained.

Four pins, P3, P5, P2 and P6, in the impedance matching module 220 are shown. Pins P3 and P5 are connected to the antenna 510. Pin P6 is connected to ground. Pin P2 is connected to one end of a choke 620. The other end of the choke 620 is connected to one end of an LED 630. LED 630 can light up to notify the user of some predetermined event. The other end of the LED 630 is connected to resistor R1. In one embodiment, resistor R1 can be 200 ohms. The other end of R1 is connected to a switch 640 which can be manipulated to transmit signals to within the computer housing.

The connection between pin P1 of the impedance matching module and the choke 620 is also connected to one end of the coaxial cable 230. In addition, ground is also connected to one end of the coaxial cable 230.

Inside the computer housing, a power source Vcc (e.g., 5V or 3.3 V) is connected to the collector of a PNP transistor 650. The collector of the transistor 650 is connected to ground through resistor R4. In one embodiment, the resistor R4 is 100 kilo-ohms. The base of the transistor 650 is connected to an "out" pin in the MCU 113, via resistors R2 and R3. In one embodiment, resistor R2 is 100 kilo-ohms, and resistor R3 is 100 ohms. The base of the transistor 650 is also connected, via R2 alone, to one end of the coaxial cable 230. This end of the coaxial cable 230 is also connected, via a capacitor C1, to an "RFin" pin of the transceiver 120a. In one embodiment, a 100 nano-Farads capacitor is used. The transceiver 120a also has a pin "RFgnd" which is connected to ground, as well as to the coaxial cable 230. Further, the MCU 113 has an "in" pin which is connected to ground via resistor R4.

Let us now discuss how circuit 600 functions. First, let us discuss the transmission of signals from within the computer housing to the outside. In order for this to happen, the switch 640 should be closed in the current embodiment.

When the switch 640 is closed, a current passes through the choke 620, the LED 630, and the resistor R1 which are in series. The choke 620 allows only DC or low frequency signals to pass through, while blocking/attenuating high frequency signals. When the MCU 113 "out" pin is set to high, (e.g., Vcc), the DC signal from the high "out" pin of the MCU 113 will be communicated, via R3 and the cable 230, to the choke 620. The choke 620, in turn, will allow this signal to pass through itself, the LED 630, resistor R1, and the switch 640. Thus, when the MCU 113 "out" pin is set to high, (e.g., Vcc), the LED 630 is lit. (Any antenna signal on the "RFin" pin of the transceiver 120a does not affect the LED 630 in any way, because the choke 620 will not allow these high frequency AC signals to pass through.)

In contrast, when the MCU 113 "out" pin is set to low (e.g., ground), the LED 630 is not lit. This is because in such a situation, there is no voltage difference between one end and the other of the series combination of the choke 620, the LED 630, the resistor R1, and the switch 640. Thus no signal passes through the LED 630, and it remains unlit when the "out" pin of the MCU 113 is set to low. (Once again, any antenna signal on the "RFin" pin of the transceiver 120a does not affect the LED 630 in any way, because the choke 620 will not allow these high frequency AC signals to pass through.) Thus signals can be transmitted from within the computer housing to the outside by manipulating MCU "out", and the user notification can occur via LED 630.

Now let us discuss transmitting signals from outside the housing to the inside of the housing. In order to transmit such signals, in this embodiment, the "out" pin of the MCU 113 is set to high, and the switch 640 is manipulated.

The transistor 650 can determine whether the switch 640 is closed or open, because, in this embodiment, a current flows through the transistor 650 only when the switch 640 is closed. When a current flows through the transistor 650 (i.e. when the switch 640 is closed), the "in" pin of the MCU 113 will have a high voltage. If the switch 640 is open, no current flows through transistor 650, and the "in" pin of the MCU 113 will be low. Thus, by detecting the voltage at the "in" pin of the MCU 113, it can be determined whether the switch 640 is open or closed. As mentioned above, because the choke 620 does not allow high frequency signals to pass through, the LED 630 and the switch 640 are unaffected by any antenna signals. In this figure, there are basically two functions:

1) Assuming the switch is closed (the majority of cases). Through the MCU out pin, one can control the LED on/off.

2) Assuming MCU out is High-Z. The MCU In pin can get the status of the switch.

As will be understood by those of skill in the art, the present invention may be embodied in other specific forms without departing from the essential characteristics thereof. For example, embodiments of the present invention could also be used with wireless communications using some types of infra-red technology. As another example, the LED and switch in FIGS. 5 and/or 6 could be replaced by other components such as MCUs. As yet another example, various antenna signals using different frequencies can be multiplexed for transmission over the same cable, and then de-multiplexed based on their different frequencies. In another alternate embodiment, the LED is in parallel with the switch, and the switch can be opened to allow LED control by the MCU. While particular embodiments and applications of the present invention have been illustrated and described, it is to be understood that the invention is not limited to the precise construction and components disclosed herein and that various modifications, changes, and variations which will be apparent to those skilled in the art may be made in the arrangement, operation and details of the method and apparatus of the present invention disclosed herein, without departing from the spirit and scope of the invention, which is defined in the following claims.

What is claimed is:

1. A system for transmitting a plurality of signals over a cable from the outside of a shielded housing of a device to the inside of the shielded housing, wherein one of the plurality of signals is an antenna signal for wireless communication, the system comprising:
   an antenna module for communicating with a remote wireless device via the antenna signal;
   a signal generator module for generating a second of the plurality of signals which originates separately from said antenna module;
   a cable in communication with the antenna module and the signal generator module for transmitting the plurality of signals from the outside of the shielded device housing to the inside of the shielded device housing;
   a signal separator module for separating the antenna signal from the second of the plurality of signals;
   a transceiver for receiving the antenna signal; and
   a Micro Controller Unit (MCU) for receiving the second of the plurality of signals.

2. The system of claim 1, wherein the second of the plurality of signals is a control signal.

3. The system of claim 2, wherein the control signal is a signal for establishing an initial connection between the device and the remote wireless device.

4. The system of claim 3, wherein the remote wireless device is a wireless computer peripheral device.

5. The system of claim 1, further comprising:
   a second signal separator module which is located outside the computer housing,
   wherein the cable further transmits the second of the plurality of signals from the inside of the device housing to the outside of the device housing.

6. The system of claim 1, further comprising:
   an impedance matching module communicatively coupled to the antenna module and the cable, for matching the impedance of the antenna module to the impedance of the cable.

7. The system of claim 1, wherein the second of the plurality of signals is a signal in accordance with the Wi-Fi standard.

8. The system of claim 1, wherein the antenna signal has a first frequency and the second of the plurality of signals has a second frequency.

9. The system of claim 8, wherein the signal separator module separates the plurality of signals based on the first frequency and the second frequency.

10. The system of claim 9, wherein the second frequency is lower than the first frequency.

11. The system of claim 10, wherein the signal separator module comprises a capacitor, which allows the first frequency to pass through, while blocking the second frequency.

12. The system of claim 10, further comprising:
   a second signal separator module located outside the device housing, wherein the second signal separator module comprises a choke which allows the second frequency to pass through, while blocking the first frequency.

13. The system of claim 1, wherein the cable is a coaxial cable.

14. The system of claim 1 wherein said antenna signal has an amplitude below an input detection level of an input of said MCU, such that said cable can be connected directly to said input of said MCU.

15. A method for transmitting a plurality of signals over a cable from the outside of a shielded housing of a device to the inside of the shielded housing, and routing the plurality of signals appropriately, wherein one of the plurality of signals is an antenna signal for wireless communication, the method comprising:
   receiving said antenna signal at an antenna module;
   generating a second of the plurality of signals which originates separately from said antenna module;
   transmitting the plurality of signals over the cable from the outside of a shielded housing of a device to the inside of the shielded housing;
   separating the plurality of signals into an antenna signal and a second of the plurality of signals;
   routing the antenna signal to a transceiver within the device housing; and
   routing the second of the plurality of signals to a Micro Controller Unit (MCU) within the device housing.

16. The method of claim 15, wherein the antenna signal has a first frequency and the second of the plurality of signals has a second frequency.

17. The method of claim 16, wherein the second frequency is lower than the first frequency.

18. The method of claim 16, wherein the steps of separating the plurality of signals comprise:
   selectively allowing the first frequency to pass through while selectively blocking the second frequency along a first path to the transceiver; and
   selectively allowing the second frequency to pass through while selectively blocking the first frequency along a second path to the MCU.

19. The method of claim 15 wherein said separating step comprised providing an antenna signal with an amplitude below an input detection level of an input of said MCU, such that said cable can be connected directly to said input of said MCU.

* * * * *